(12) United States Patent
Li et al.

(10) Patent No.: US 9,578,768 B1
(45) Date of Patent: Feb. 21, 2017

(54) LASER-COLORED SAPPHIRE MATERIAL

(71) Applicant: Apple Inc., Cupertino, CA (US)

(72) Inventors: Michael M. Li, Cupertino, CA (US);
Christopher R. Fagan, Cupertino, CA (US); Anubhav Prasad, Worcester, MA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/850,535

(22) Filed: Sep. 10, 2015

(51) Int. Cl.
| | | |
|---|---|---|
| *G06F 1/16* | (2006.01) | |
| *H05K 5/03* | (2006.01) | |
| *H05K 5/00* | (2006.01) | |
| *B01J 19/12* | (2006.01) | |

(52) U.S. Cl.
CPC ............... *H05K 5/03* (2013.01); *B01J 19/121* (2013.01); *H05K 5/0004* (2013.01); *H05K 5/0017* (2013.01)

(58) Field of Classification Search
CPC .................................. G06F 1/16; G06F 1/1656
See application file for complete search history.

(56) References Cited

U.S. PATENT DOCUMENTS

| | | | | |
|---|---|---|---|---|
| 2014/0334077 A1* | 11/2014 | Kwong | ............... | H04M 1/0249 361/679.01 |
| 2015/0346782 A1* | 12/2015 | Bushnell | ................ | G06F 1/181 361/679.02 |
| 2016/0037656 A1* | 2/2016 | Kim | .......................... | G06F 1/16 361/749 |
| 2016/0309866 A1* | 10/2016 | Kay | ....................... | A45C 13/02 |

\* cited by examiner

*Primary Examiner* — Anthony Q Edwards
(74) *Attorney, Agent, or Firm* — Brownstein Hyatt Farber Schreck, LLP

(57) ABSTRACT

A colored sapphire material and methods for coloring sapphire material using lasers are disclosed. The method for coloring the sapphire material may include positioning the sapphire material over an opaque substrate material, exposing the opaque substrate material to a laser beam passing through the sapphire material to impact the substrate material, and inducing a chemical change in a portion of the sapphire material exposed to the laser beam. The method may also include creating a visible color in the portion of the sapphire material as a result of the chemical change. The colored sapphire material may include a first transparent portion, and a second, colored portion substantially surrounded by the first portion. The second, colored portion may have a chemical composition different than that of the first portion.

20 Claims, 13 Drawing Sheets

LASER-COLORED SAPPHIRE MATERIAL

FIELD

The disclosure relates generally to sapphire material, and more particularly to laser-colored sapphire material and methods of coloring sapphire material using lasers.

BACKGROUND

Conventional electronic devices are typically made from durable materials to protect the electronic components of the device. Various portions of the device are thus formed from materials that withstand the everyday wear-and-tear applied to the electronic device. That is, portions of the electronic device may be formed from a material that may withstand constant handling of the electronic device by a user, the transportation and/or packing of the electronic devices and undesired blunt forces (e.g., dropping, sitting on) applied to the electronic device during use. Conventional electronic devices may be formed from metals (e.g., aluminum), reinforced glass, and/or polymers (e.g., plastic, rubber).

Alumina ($Al_2O_3$), one example of which is sapphire typically, is not used to form most portions of electronic devices. As a result of the physical and/or chemical properties of sapphire, certain manufacturing processes used to form portions or components of an electronic device may be difficult and/or expensive to perform on sapphire material. For example, housings for electronic devices typically include designs, text or logos formed right on or in the material forming the housing. The designs, text or logos may be painted directly on a surface of the housing, and the housing may undergo various processes (e.g., heat-setting, coating, and so on) to prevent the paint from being removed. However, over time and normal use of the electronic device, the paint may begin to wear and be removed, as the paint is only applied to a surface of the sapphire material.

Laser etching or burning may also be used to form logos on sapphire material. However, these processes typically require the use of difficult and complex intermediate steps, such as ion bombardment of the sapphire material, in order for the etch or burn to be successful on the sapphire material. These complex steps, which are required because of the physical and/or chemical properties of sapphire, increase cost, time and complexity of successfully etching or burning the sapphire. In addition, the visible color of each etched or burned logo onto the sapphire material is typically limited to black, gray or white.

SUMMARY

A method of coloring a sapphire material. The method comprises positioning the sapphire material over an opaque substrate material, exposing the opaque substrate material to a laser beam passing through the sapphire material to impact the substrate material, and inducing a chemical change in a portion of the sapphire material exposed to the laser beam. The method also comprises creating a visible color in the portion of the sapphire material as a result of the chemical change.

A sapphire component comprising a first transparent portion, and a second, colored portion substantially surrounded by the first portion, the second, colored portion comprising a chemical composition different than that of the first portion.

An electronic device comprising a housing, a cover glass coupled to the housing for protecting a display positioned within the housing, and an input button positioned through a portion of the housing. The electronic device also comprises a sapphire component forming at least a portion of an external surface of the housing. The sapphire component comprises a first portion, and a second, colored portion positioned adjacent the first portion. The second portion comprises atoms different than atoms of the first portion.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
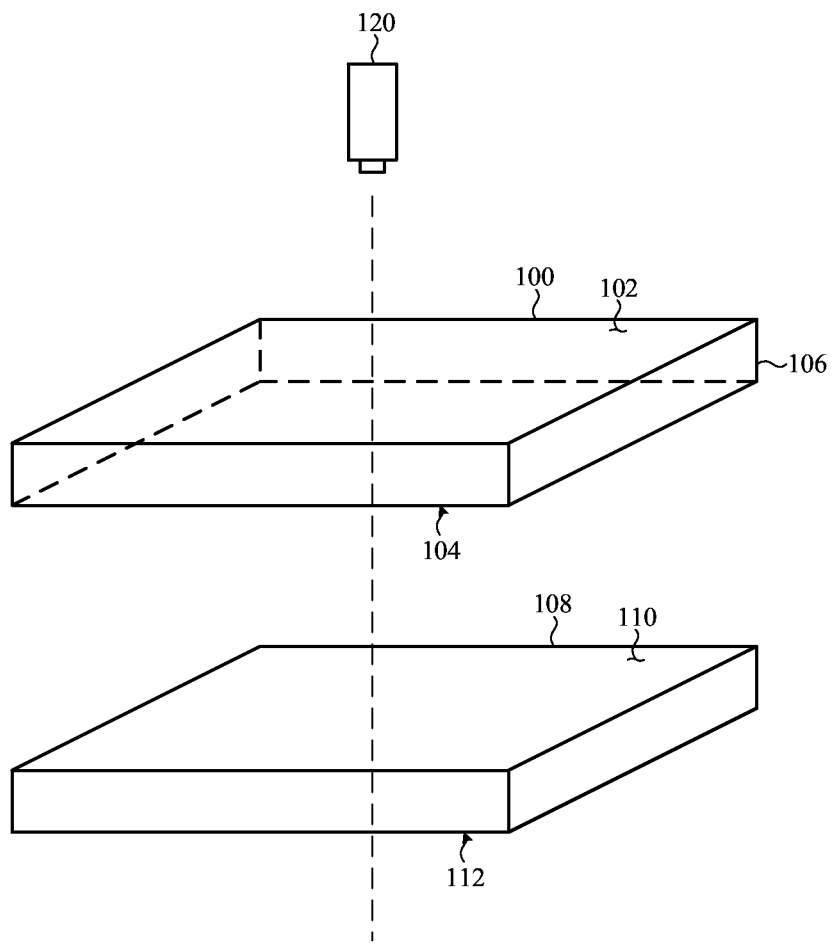
FIG. 1A depicts a sapphire material, an opaque substrate material and a laser utilized to color a sapphire material.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates generally to sapphire materials, and more particularly, to laser-colored sapphire material and methods of coloring sapphire material using lasers.

In a particular embodiment, process or method for coloring sapphire material includes positioning sapphire material over an opaque substrate material, typically a metal or metal alloy, and subsequently exposing the opaque substrate material to a laser through the sapphire material to induce a chemical change in the exposed portion of the sapphire material. The chemical change in the sapphire material results in a change in visible color through a portion of the sapphire material that is exposed to the laser. Specifically, the formation of a color within the sapphire material is a result of an exchange of ions and/or atoms between the opaque substrate material and the sapphire material, and/or the embedding of ions and/or atoms from the opaque substrate material into the crystal lattice of the sapphire material.

Further, the visible color portion is permanently formed in the sapphire material, and is not easily removed. Additionally, the visible color varies the operational parameters and/or characteristics of the laser beam and/or the material composition of the opaque substrate material. As a result, the sapphire material can includes distinct and different visible colored portions, and even multiple colored regions within the same sapphire material.

As discussed herein, the chemical change experienced by the sapphire material may refer to a variety of chemical, compositional and/or physical changes experienced by the sapphire material. In non-limiting examples discussed herein, the chemical change experienced by the sapphire material may refer to an exchange of ions and/or atoms between the opaque substrate material and the sapphire material, or embedding ions and/or atoms released from the opaque substrate material into the crystal lattice of the sapphire material. In additional non-limiting examples, the chemical change may refer to the change or alteration of the structure of the sapphire material with respect to the atoms forming the sapphire material, the compositional structure of the sapphire material and/or the physical structure of the sapphire material. In a further non-limiting example, the chemical change may refer to the change and/or alteration in the material change of the sapphire material, where the changed sapphire material may be materially and/or compositionally distinct from pure sapphire (e.g., Alumina ($Al_2O_3$)).

These and other embodiments are discussed below with reference to FIGS. 1A-7B. However, those skilled in the art will readily appreciate that the detailed description given herein with respect to these Figures is for explanatory purposes only and should not be construed as limiting.

Figure 1B:
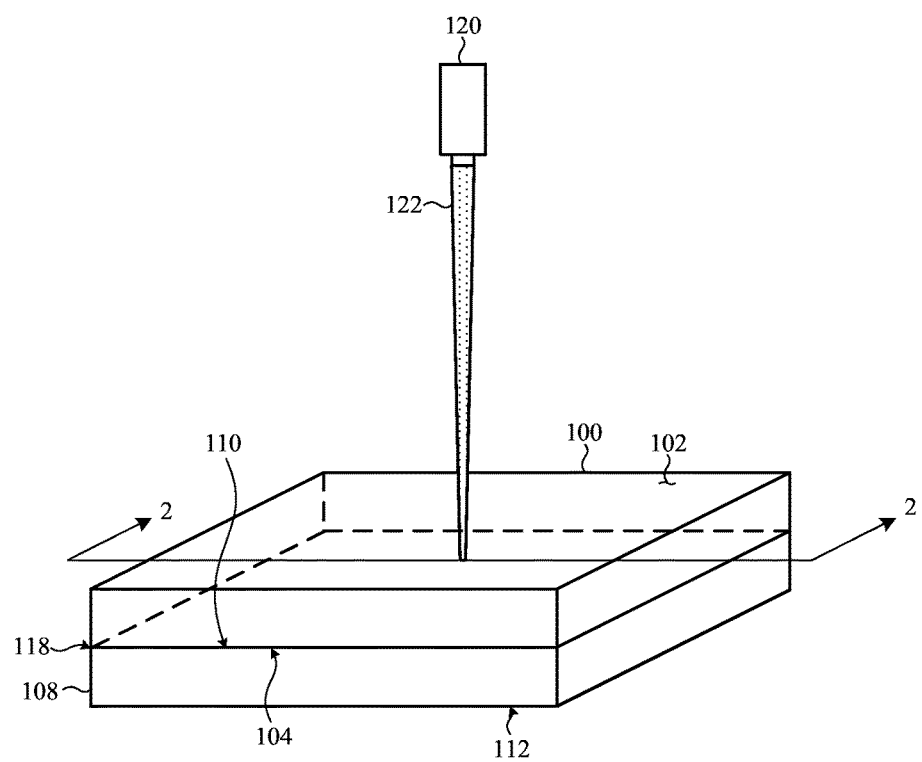
FIG. 1B depicts the sapphire material, the opaque substrate material and the laser utilized to color the sapphire material of FIG. 1A in an assembled position.

FIGS. 1A and 1B show illustrative perspective views of components utilized to color a sapphire material. One component may be a sapphire material 100. Sapphire material 100, as shown in FIGS. 1A and 1B, can be naturally occurring or a wafer of artificially grown corundum to be further processed (e.g., colored, and/or polished) and used in an electronic device, as discussed herein. The artificially grown corundum used to form sapphire material 100 is grown using any conventional growth process including, but not limited to: hydrothermal growth; vertical horizontal gradient freezing ("VHGF"); edge-defined film-fed growth ("EFG"); horizontal moving growth (e.g., Bridgman growth); and Kyropoulos growth. Additionally, naturally occurring corundum can also form sapphire material 100, and are processed similar to the artificially grown corundum in preparation for forming sapphire material 100. Sapphire material 100 can be utilized as a variety of components of many distinct electronic devices. In non-limiting examples, and discussed in detail herein, sapphire material 100 can be used to form cover glass, buttons, housings or enclosures, and the like for electronic devices.

Sapphire material 100 has a top surface 102 and a bottom surface 104 positioned opposite top surface 102. As shown in FIG. 1A, sidewall 106 are substantially perpendicular to top surface 102 and bottom surface 104, respectively. Sapphire material 100 has a plurality of plane orientations for the surfaces (e.g., top surface 102, bottom surface 104) of sapphire material 100. Each of the surfaces of sapphire material 100 may be in alignment with a crystallographic plane orientation determined by the formation of sapphire material 100. In the non-limiting example shown in FIGS. 1A and 1B, top surface 102 has an A-plane crystallographic orientation, while sidewall 106 has a C-plane crystallographic orientation.

Corundum (e.g., sapphire) is an anisotropic material. The crystallographic orientations of the surfaces of components made from sapphire (e.g., sapphire material 100) affect the physical properties and/or material characteristics (e.g., strength, ductility, elasticity, and so on) of the component. Further, the crystallographic orientation of the various surfaces are dependent on the growing processes used for creating sapphire material 100 and/or the additional processes used to form sapphire material 100. For example, sapphire material 100 may be grown using an EFG growth process. In the growth process, a seed crystal may include a plane orientation that may allow for specific, desired planes (e.g., C-plane, A-plane) to be utilized in components formed from the resulting sapphire. By knowing the orientation of the seed crystal used in the EFG growth process, and ultimately knowing the crystallographic orientation of the grown sapphire, manufacturers can cut the sapphire in a specific direction to form sapphire material 100 and subsequent components from sapphire material 100 with surfaces having specific plane crystallographic orientations, or substantially desirable plane crystallographic orientations.

FIGS. 1A and 1B also depict an opaque substrate material 108. Opaque substrate material 108 can be formed from any substantially rigid material that may support sapphire material 100 during a coloring process and impart color to sapphire material 100 as a result of the processes discussed herein. In non-limiting examples, opaque substrate material 108 is formed from metal or metal alloys including, but not limited to, stainless steel, aluminum, titanium, copper, iron, cobalt, chromium, tungsten, brass, nickel-carbon, sterling silver, and so on. In additional non-limiting examples, opaque substrate material 108 is formed from nonmetals or compounds including, but not limited to, carbon, phosphorus, sulfur and so on. As discussed herein, the material composition of opaque substrate material 108 substantially affect the visible color formed on/within sapphire material 100 during a coloring process.

Opaque substrate material 108 includes a top surface 110 and a bottom surface 112 positioned opposite top surface 110; top surface 110 is connected to bottom surface 112 by one of more sidewalls. As shown in FIG. 1B, bottom surface 104 of sapphire material 100 contacts top surface 110 of opaque substrate material 108 when a process of coloring sapphire material 100 is performed. That is, sapphire material 100 is disposed, placed or positioned over, on, or otherwise adjacent to opaque substrate material 108 when performing a process for coloring a portion of sapphire material 100. As a result of sapphire material 100 being positioned over and/or on top of opaque substrate material 108, an interface 118 is formed between the bottom surface 104 of sapphire material 100 and top surface 110 of opaque substrate material 108. In the non-limiting example shown in FIG. 1B, no intermediate layer is positioned between and/or separate sapphire material 100, and opaque substrate material 108. Additionally, sapphire material 100 and opaque substrate material 108 typically abut one another such that no space or gap exists between the, when sapphire material 100 undergoes a coloring processes, as discussed herein. In another non-limiting example, an intermediate layer and/or a gap is present between sapphire material 100, and opaque substrate material 108 during the coloring processes discussed herein.

A laser 120 is also shown in FIGS. 1A and 1B. Laser 120 is positioned above sapphire material 100, and emits a laser beam 122 toward sapphire material 100 and opaque substrate material 108 (see, FIG. 1B) during a process for coloring sapphire material 100. As discussed in detail herein, laser beam 122 of laser 120 passes through transparent sapphire material 100 and contacts top surface 110 of opaque substrate material 108. Laser beam 122 of laser 120 passes through sapphire material 100 because of sapphire material's 100 transparent properties and/or as a result of the operational parameters (for example, pulse width, frequency, and so on) of laser beam 122. Laser beam 122 of laser 120 contacting top surface 110 of opaque substrate material 108 induces a chemical change in sapphire material 100. As discussed herein, when laser beam 122 contacts opaque substrate material 108, ions and/or atoms of opaque substrate material 108 may be excited, and subsequently exchanged with or implanted between the ions and/or atoms of sapphire material 100. The laser-induced chemical change in sapphire material 100 results in the creation of a visible color in a portion of sapphire material 100 exposed to laser beam 122. Although shown as converging toward sapphire material 100, it is understood that the depicted shape of laser beam 122 of laser 120 is arbitrary. As such, all features formed in sapphire material 100 by laser beam 122, as discussed herein, can be formed independent of the depicted shape or geometry of laser beam 122.

Laser 120 may be any suitable laser that may pass through sapphire material 100, contact opaque substrate material 108 and/or cause a chemical change in sapphire material 100 and/or opaque substrate material 108, resulting in the formation of visible color in sapphire material 100. In a non-limiting example laser 120 may be an infrared (IR) laser that may emit an IR laser beam (e.g., laser beam 122) toward and/or through sapphire material 100. As discussed herein, the operational parameters and/or characteristics (e.g., frequency, wavelength, pulse width and so on) of laser 120 and/or emitted laser beam 122 may substantially affect the visible color formed on/within sapphire material 100 during a coloring process.

FIGS. 2A-2G show cross-section side views of sapphire material 100, opaque substrate material 108 and laser beam 122 of FIG. 1B during a process of coloring sapphire material 100. As discussed herein, sapphire material 100 is disposed, placed or positioned over and/or on opaque substrate material 108 when coloring sapphire material 100. As shown in FIGS. 2A-2G, sapphire material 100 is positioned directly over and/or contacts opaque substrate material 108. Interface 118 is the point, plane and/or region between bottom surface 104 of sapphire material 100 and top surface 110 of opaque substrate material 108. Interface 118 can be the point of contact between sapphire material 100 and opaque substrate material. Additionally discussed herein and shown in the embodiments of FIGS. 2A-2G, no intermediate layer, component substrate and/or substance is positioned between sapphire material 100 and opaque substrate material 108, nor is there a gap between sapphire material 100 and opaque substrate material 108.

Figure 2A:
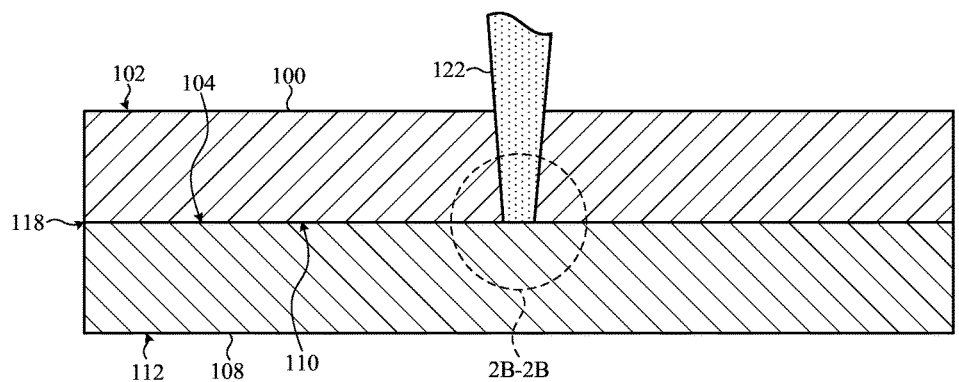
FIG. 2A depicts a cross-section view of the sapphire material and the opaque substrate material taken along line 2-2 of FIG. 1B. The sapphire material and the opaque substrate material are shown as being initially exposed to a laser beam used to color the sapphire material.
Figure 2B:
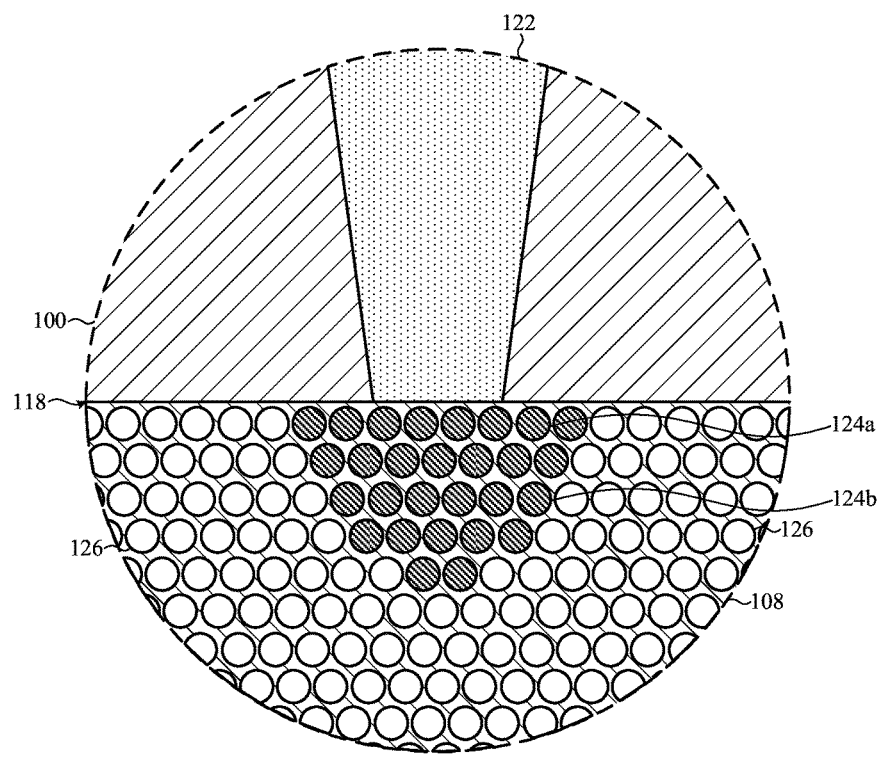
FIG. 2B depicts an enlarged portion 2B-2B of the sapphire material and the opaque substrate material of FIG. 2A.

FIGS. 2A and 2B shows sapphire material 100 and opaque substrate material 108 being initially exposed to laser beam 122 of laser 120. FIG. 2B shows an enlarged portion 2B-2B of FIG. 2A. In a non-limiting example, laser beam 122 passes completely through sapphire material 100. Laser beam 122 passes through sapphire material 100 without substantially affecting the majority of the portion of sapphire material 100 exposed to laser beam 122. The operational parameters and/or characteristics of laser beam 122 and/or the transparent properties of sapphire material 100 allow laser beam 122 to pass through sapphire material 100 without affecting the majority of the portion of sapphire material 100 exposed to laser beam 122. However, and as discussed in detail herein, the bottom surface 104 of sapphire material 100, and an internal portion of sapphire material 100 surrounding bottom surface 104 are affected (e.g., undergo an chemical, compositional, ionic and/or atomic change) as a result of being exposed to laser beam 122.

Laser beam 122 of laser 120 passes completely through sapphire material 100 and may contact opaque substrate material 108. In a non-limiting example shown in FIGS. 2A and 2B, laser beam 122 contacts top surface 110 of opaque substrate material 108, and as a result, interface 118 formed between sapphire material 100 and opaque substrate material 108 may be exposed to laser beam 122. In the non-limiting example where opaque substrate material 108 is formed from a metal or metal alloy material, laser beam 122 cannot substantially pass through opaque substrate material 108 like sapphire material 100, although laser beam 122 may melt, ablate and/or penetrate at least a portion of opaque substrate material 108. Further, laser beam 122 contacts, reflect from and/or is absorbed by top surface 110 of opaque substrate material 108. The interaction between laser beam 122 and opaque substrate material 108 may result in a chemical change in opaque substrate material 108 and/or sapphire material 100.

Enlarged portion 2B-2B shown in FIG. 2B depicts the chemical, material, compositional ionic and/or atomic change that may occur during the initial exposure of interface 118 to laser beam 122. In a non-limiting example shown in FIG. 2B, exposing opaque substrate material 108 to laser beam 122 may excite atoms 124a, 124b of opaque substrate material 108. That is, exposing opaque substrate material 108 to and/or allowing laser beam 122 to pass through sapphire material 100 and contact, reflect and/or be absorbed by opaque substrate material 108 results in atoms 124a, 124b of opaque substrate material 108 being excited. As shown in insert FIG. 2B, surface atoms 124a, forming top surface 110 of opaque substrate material 108, are altered from a steady-state to an excited state when exposed and/or directly contacted by laser beam 122. Laser beam 122 may diffuse on top surface 110 of opaque substrate material 108, as shown in FIG. 2B, or alternatively, may continue to pass through at least a portion of opaque substrate material 108.

A region of excited atoms 124b extends into at least a portion of opaque substrate material 108. Still with reference to FIG. 2B, atoms 124b positioned below excited surface atoms 124a are also be excited by laser beam 122 during the process of coloring sapphire material 100. In the non-limiting example, laser beam 122 may be absorbed by and/or into opaque substrate material 108, and as such, transfer energy to excite subsurface atoms 124b and surface atoms 124a. During the initial exposure to laser beam 122, as shown in FIG. 2B, the number of excited atoms 124b positioned below excited surface atoms 124a decreases as the distance from top surface 110 of opaque substrate material 108 increases.

All atoms of opaque substrate material 108 may not be excited. Rather, atoms 126 of portions of opaque substrate material 108 not exposed to laser beam 122 may remain in a steady state. Additionally, atoms 126 positioned a substantial distance below top surface 110 of opaque substrate material 108 that are not impacted by laser beam 122 may also be unaltered and/or may remain in a steady state.

Although discussed herein as contacting, reflecting and/or absorbing laser beam 122, opaque substrate material 108 can be affected by laser beam 122 in various other ways. In a non-limiting example, laser beam 122 excites atoms 124a, 124b of opaque substrate material 108, and in the process also ablates, melts, burns, or etches a portion of opaque substrate material 108 when the material is exposed to laser beam 122. These various processes that opaque substrate material 108 may undergo when exposed to laser beam 122, and the exciting of atoms 124a, 124b may result in any or some chemical, ionic, atomic and/or compositional change in opaque substrate material 108. These various processes, and the resulting chemical, ionic, atomic and/or compositional change achieved in opaque substrate material 108, may color sapphire material 100, as discussed herein.

The term "atoms," as used herein, refers to the particles of matter that make up the material of opaque substrate material 108. Atoms may generally, and indiscriminately, refer to the atoms that make-up and/or form the entire material of opaque substrate material 108. In a non-limiting example where opaque substrate material 108 is formed from stainless steel, atoms may be used as a general description, and may refer to the atoms of all elements (e.g., chromium, iron, and so on) of the stainless steel indiscriminately. As such, and as described herein, excited atoms 124a, 124b may be any atoms associated with any of the various elements that form stainless steel. In another non-limiting example, the atoms 124a, 124b excited in opaque substrate material 108 and transferred to sapphire material 100, as described below, may be multiple atoms of different elements that form the material (e.g., stainless steel) of opaque substrate material 108.

In an additional non-limiting example, the term atoms may be used to describe the specific elemental atom forming a compound material formed from multiple elements. In the additional non-limiting example above, opaque substrate material 108 may be formed from stainless steel. Excited atoms 124a, 124b may only refer elemental atoms associated with a single element (e.g., iron) that forms a portion of the stainless steel. The distinct, elemental atoms forming the compound material may be distinctly or separately excited based on the operational parameters and/or characteristics of laser 120 and/or laser beam 122. Additionally, and as discussed herein, the excited atoms of each distinct element forming the component material may affect the visible color created on sapphire material 100.

Figure 2C:
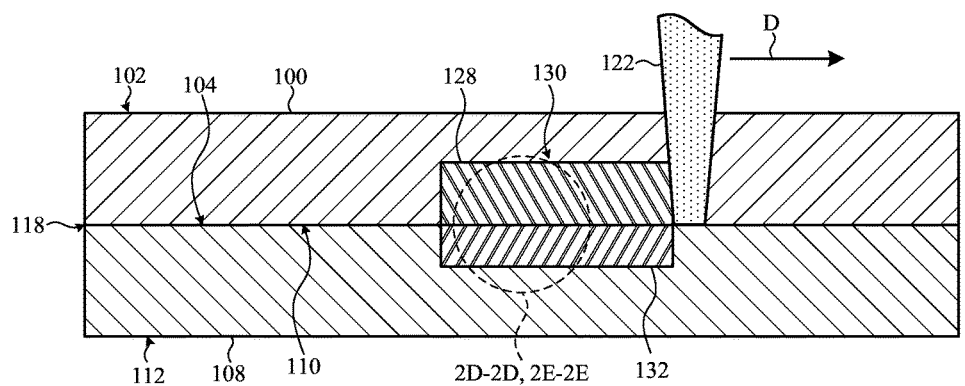
FIG. 2C depicts a cross-section view of the sapphire material and the opaque substrate material taken along line 2-2 of FIG. 1B. The sapphire material and the opaque substrate material are shown after being exposed to the laser beam used to color the sapphire material.
Figure 2D:
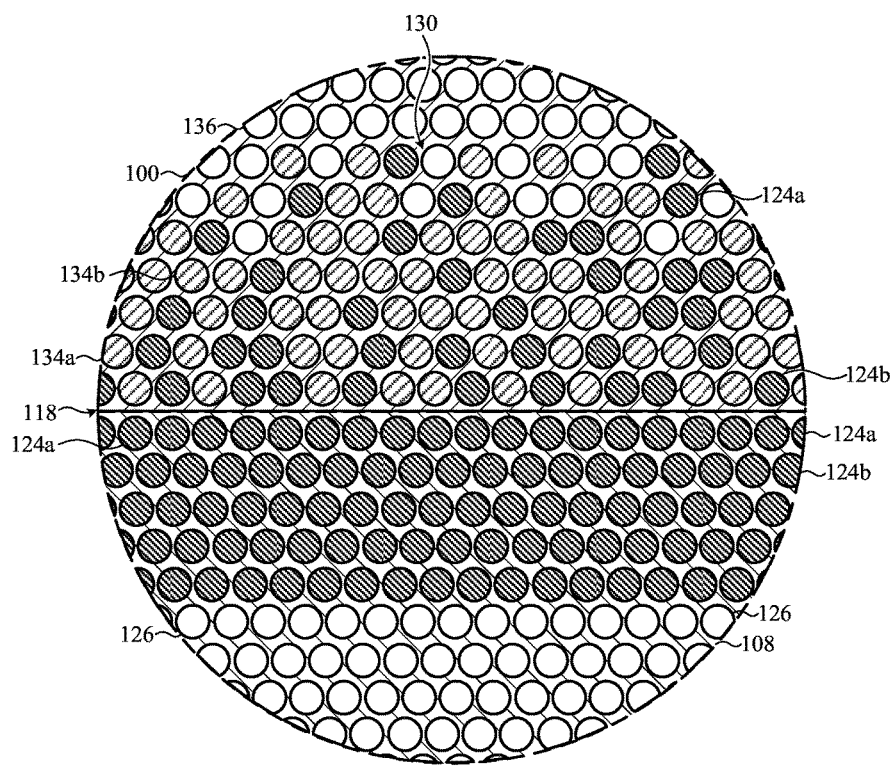
FIG. 2D depicts an enlarged portion 2D-2D of the sapphire material and the opaque substrate material of FIG. 2C.
Figure 2E:
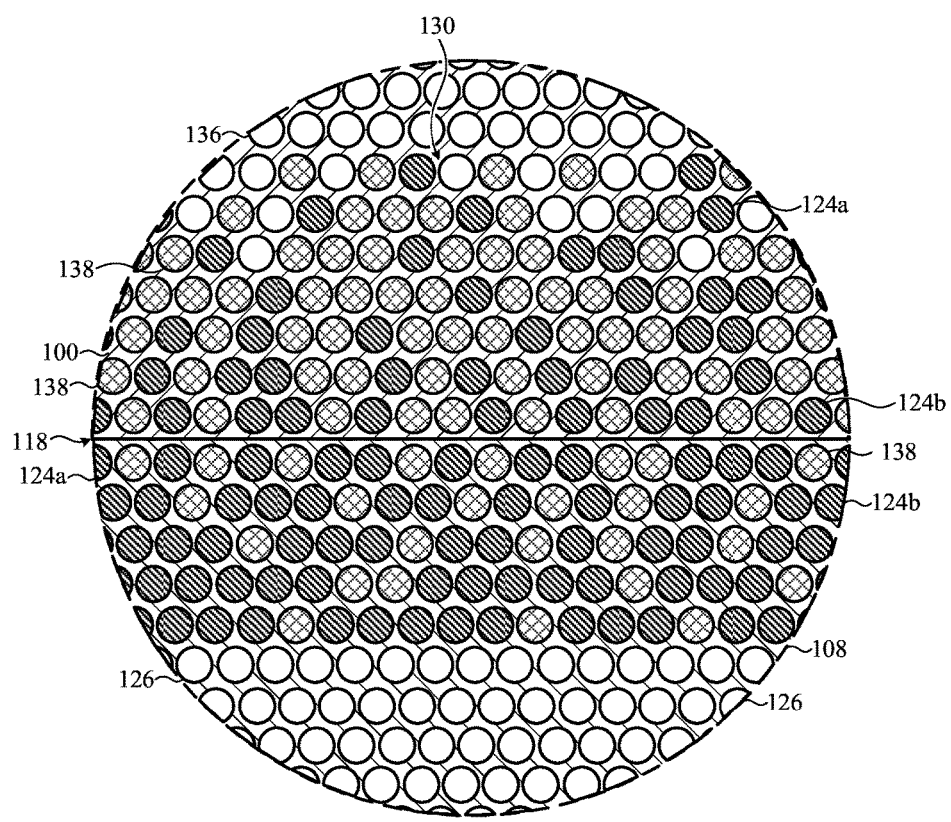
FIG. 2E depicts an enlarged portion 2E-2E of the sapphire material and the opaque substrate material of FIG. 2C.

FIGS. 2C-2E shows sapphire material 100 and opaque substrate material 108 after the initial exposure to laser beam 122 of laser 120. In the non-limiting example shown in FIG. 2C, after the initial exposure, laser beam 122 moves in a direction (D), passes through distinct portions of sapphire material 100 and may be exposed to distinct portions bottom surface 104 of sapphire material 100 and top surface 110 of opaque substrate material 108 at interface 118. Laser beam 122 is moved in a desired direction and/or in a desired pattern to form a design (e.g., logo, graphic, glyph and so on) out of visible color within sapphire material 100, as discussed herein.

Also shown in FIG. 2C, a portion 128 of sapphire material 100 that was exposed to laser beam 122 has undergone a laser-induced chemical, compositional and/or atomic change. In a non-limiting example, chemically changed portion 128 of sapphire material 100 is a portion of sapphire material 100 positioned adjacent interface 118 and exposed to laser beam 122. Additionally, laser beam 122 has passed through chemically changed portion 128 of sapphire material 100 to impact opaque substrate material 108. As shown in FIG. 2C, chemically changed portion 128 of sapphire material 100 begins adjacent interface 118 and/or at bottom surface 104 of sapphire material 100 and may extend partially into or through sapphire material 100. As discussed herein, the depth to which chemically changed portion 128 extends into sapphire material 100 depends, at least partially, on the operational parameters and/or characteristics of laser 120 and/or laser beam 122. Additionally as shown in FIG. 2C and discussed herein, distinct portions of sapphire material 100 surrounding chemically changed portion 128 may be substantially unaffected by laser beam 122, may be chemically and/or compositionally distinct from chemically changed portion 128, and/or may remain substantially transparent.

The chemical, compositional and/or atomic change that occurs in chemically changed portion 128 as a result of exciting and transferring atoms 124a, 124b from opaque substrate material 108 to sapphire material 100 results in a visible color region 130 being formed in sapphire material 100. As shown in FIG. 2C, visible color region 130 of sapphire material 100 has a distinct color from the color (e.g., clear) of the remaining portions of sapphire material 100. In a non-limiting example, the remaining portions of sapphire material are clear and substantially transparent, while visible color region 130 may include various colors within the visible light spectrum. Additionally, and as similarly discussed herein, with respect to chemically changed portion 128, visible color region 130 is formed only in and/or through a portion of sapphire material 100. Visible color region 130 is substantially visible through the unaffected, transparent portion of sapphire material 100 positioned between visible color region 130 and top surface 102 of sapphire material 100.

As discussed herein, a portion 132 of opaque substrate material 108 may also undergo a laser-induced chemical, compositional and/or atomic change. In a non-limiting example shown in FIG. 2C, and as previously discussed herein with respect to FIG. 2B, opaque substrate material 108 may undergo various processes (e.g., ablation, melting, burning, etc.) as a result of being exposed to laser beam 122, which may result in the formation of chemically changed portion 132 in opaque substrate material 108. As discussed herein, the laser-induced chemically changed portion 132 of opaque substrate material 108 forms laser-induced chemically changed portion 128 of sapphire material 100 and/or creates visible color region 130 in chemically changed portion 128 of sapphire material 100.

Enlarged portion shown in FIG. 2D depicts a non-limiting example of chemically changed portion 128 of sapphire material 100. In the non-limiting example shown in FIG. 2D, chemically changed portion 128 includes visible color region 130 formed in chemically, compositionally and/or atomically altered sapphire material 100. Additionally, chemically changed portion 128 includes a chemically, compositionally and/or atomically altered part of sapphire material 100 positioned adjacent bottom surface 104, and extending partially into or through sapphire material 100. In the non-limiting example, chemically changed portion 128, of altered portions of sapphire material 100 are altered on an atomic level. That is, and similar to the configuration shown in FIG. 2B, altering sapphire material 100 at bottom surface 104 and within an internal portion of sapphire material 100 to form chemically changed portion 128 occurs by altering and/or exciting surface atoms 134a and distinct atoms 134b positioned adjacent surface atoms 134a. The alteration or exciting of atoms 134a, 134b of sapphire material 100 to form chemically changed portion 128 in sapphire material 100 creates visible color in visible color region 130 of sapphire material 100. In the non-limiting example, the exciting of atoms 134a, 134b of sapphire material 100 in chemically changed portion 128 alters the chemical, compositional and/or atomic properties in chemically changed portion 128 of sapphire material 100. Additionally, and as discussed herein, exciting of atoms 134a, 134b of sapphire material 100 in chemically changed portion 128 and the resulting alteration of the chemical, compositional and/or atomic properties in chemically changed portion 128 of sapphire material 100 allows exited atoms 124a, 124b of opaque substrate material 108 to be transferred to sapphire material 100 to create visible color in sapphire material 100.

Similar to configuration shown in FIG. 2B, the number of excited atoms 134b positioned adjacent surface atoms 134a of sapphire material 100 decreases as the distance from bottom surface 104 of sapphire material 100 increases. As shown in FIG. 2D, the greater the distance from bottom surface 104 of sapphire material 100, the less likely it is that the atoms making up sapphire material 100 are excited. Rather the atoms 136 maintain a steady state, and as a result, maintain transparency. Additionally, the atoms forming sapphire material 100 positioned directly adjacent top surface 102 and the atoms positioned within an interior portion or depth of sapphire material 100 also remain as steady state atoms 136. As such, the number of excited atoms 134a, 134b of sapphire material 100 increases when moving from top surface 102 to bottom surface 104 of sapphire material 100. Further, the lowest concentration (e.g., none) of excited atoms 134a, 134 are positioned adjacent top surface 102, and the highest concentration of excited atoms 134a, 134b are positioned adjacent bottom surface 104.

Also similarly discussed herein with respect to opaque substrate material 108 in FIG. 2B, not all atoms of sapphire material 100 are altered from a steady state to an excited state. In the non-limiting example shown in FIG. 2D, atoms 136 of portions of sapphire material 100 surrounding chemically changed portion 128 and atoms 134a, 134b may remain in a steady state. Unaltered or affected atoms 136 may be positioned between chemically changed portion 128 creating first color region 130 in sapphire material 100, and top surface 102 of sapphire material, as discussed herein. Additionally, it is understood that atoms 136 not exposed to laser beam 122, and surrounding chemically changed portion 128 creating first color region 130 in sapphire material 100 may also be unaltered and/or may remain in a steady state. The portions of sapphire material 100 that are not exposed to laser beam 122 may have steady state atoms 136 positioned entirely through sapphire material 100 (e.g., from bottom surface 104/interface 118 to top surface 102). Unaltered or unaffected, steady state atoms 136 may maintain transparency in those portions for sapphire material 100.

The exposure to laser beam 122 and subsequent modification (e.g., melting, burning ablating, etc.), if any, of opaque substrate material 108 aids in the inducing and/or forming chemically changed portion 128, and ultimately, the creation of visible color region 130 in sapphire material 100. As shown in FIG. 2D, during the chemical change in sapphire material 100, at least a portion of excited atoms 124a, 124b of opaque substrate material 108 are transferred, enter and/or are embedded in sapphire material 100. Excited atoms 124a, 124b may be embedded and scattered within sapphire material 100, amongst the excited atoms 134a, 134b of sapphire material 100. The number of excited atoms 124a, 124b of opaque substrate material 108 that may be embedded into sapphire material 100 may decrease as the distance from bottom surface 104 of sapphire material 100 increases.

Additional changes in sapphire structure 100 may also aid in inducing and/or forming chemically changed portion 128, and ultimately, the creation of visible color region 130 in sapphire material 100. That is, the sapphire material's 100 exposure to laser beam 122, and/or the effects laser beam 122 has on opaque substrate material 108 may result in chemical, compositional and/or atomic changes in sapphire structure that may aid in inducing or forming chemically changed portion 128 formed in sapphire material 100. Turning to FIG. 2E, a non-limiting example of an additional change to sapphire material 100 is shown. Distinct from FIG. 2D, FIG. 2E shows atoms 138 of sapphire material 100 that are elemental oxygen forming sapphire material 100. In the non-limiting example, the number of oxygen atoms 138 in sapphire material 100 changes in chemically changed portion 128. That is, oxygen atoms 138 may be transferred from sapphire material 100 to the atmosphere and/or to opaque substrate material 108, as shown in FIG. 2E, which may result in the chemical change or alteration of sapphire material 100. By releasing or removing oxygen from sapphire material 100, the chemical and/or compositional characteristics of sapphire material 100 may be altered or changed. This alteration of the amount of oxygen in sapphire material 100 may also aid in the creation and/or influence the creation of visible color region 130 of sapphire material 100.

Although shown in two distinct illustrations, the embedding of excited atoms 124a, 124b of opaque substrate material 108, as depicted in FIG. 2D, and altering of the oxygen of sapphire material 100, as depicted in FIG. 2E, may not be mutually exclusive. The laser-induced chemical change formed in the portion 128 of sapphire material 100 may occur as a result of embedding exited atoms 124a, 124b of opaque substrate material 108 in sapphire material 100, as a result of altering the amount of oxygen in portion 128 of sapphire material 100, or a combination of the two. In the non-limiting example involving both processes, the oxygen atoms of sapphire material 100 may be replaced by excited atoms 124a, 124b of opaque substrate material.

The laser-induced chemical change in portion 128 of sapphire material 100 results in a visible color being formed in visible color region 130 of sapphire material 100. In the non-limiting example shown in FIGS. 2D and 2E, as a result of the chemical, atomic and/or compositional change in portion 128 of sapphire material 100, visible color region 130 may be formed in sapphire material 100, such that a user or viewer of sapphire material 100 may see distinct, the visible color region in sapphire material 100. As discussed herein, visible color region 130 in laser-induced chemically changed portion 128 of sapphire material 100 may be a different color than the remaining, unaffected portion of sapphire material. Additionally, visible color region 130 may alter the optical transparency of chemically changed portion 128 of sapphire material 100. For example, chemically changed portion 128 may be substantially translucent or opaque. As discussed herein, even where chemically changed portion 128 is translucent or opaque, visible color region 130 may still be seen through unaffected, transparent portions of sapphire material 100 positioned adjacent and/or in-line with visible color region 130 and/or chemically changed portion 128. Visible color region 130 may be any color or light that is included within the visible color spectrum.

As discussed herein, created visible color region 130 of sapphire material 100 may be dependent on a material composition of opaque substrate material 108. In a non-limiting example, where opaque substrate material 108 is formed from zinc, visible color region 130 formed on sapphire material 100 using the process discussed herein may be white. In another non-limiting example, where opaque substrate material 108 is formed from stainless steel, visible color region 130 formed on sapphire material 100 may be blue.

In other non-limiting examples, and separate from or in conjunction with the material composition of opaque substrate material 108, created visible color region 130 of sapphire material 100 may be dependent on operational parameters or characteristics of laser 120 and/or laser beam 122. Operational parameters or characteristics of laser 120 and/or laser beam 122 may include, but are not limited to, laser frequency, laser wavelength, laser pulse length, laser beam exposure size and the like. Where the operational parameters or characteristics of laser 120 and/or laser beam 122 are altered, the laser-induced chemical change in sapphire material 100 may also be altered. This may result in a distinct and/or varied visible color being formed in sapphire material 100.

Figure 2F:
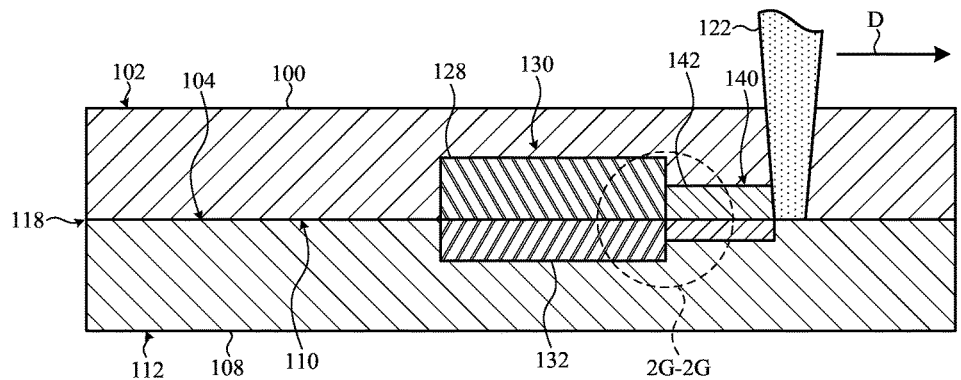
FIG. 2F depicts a cross-section view of the sapphire material and the opaque substrate material taken along line 2-2 of FIG. 1B. The sapphire material and the opaque substrate material are shown as being exposed to a laser beam used to color the sapphire material two distinct colors.
Figure 2G:
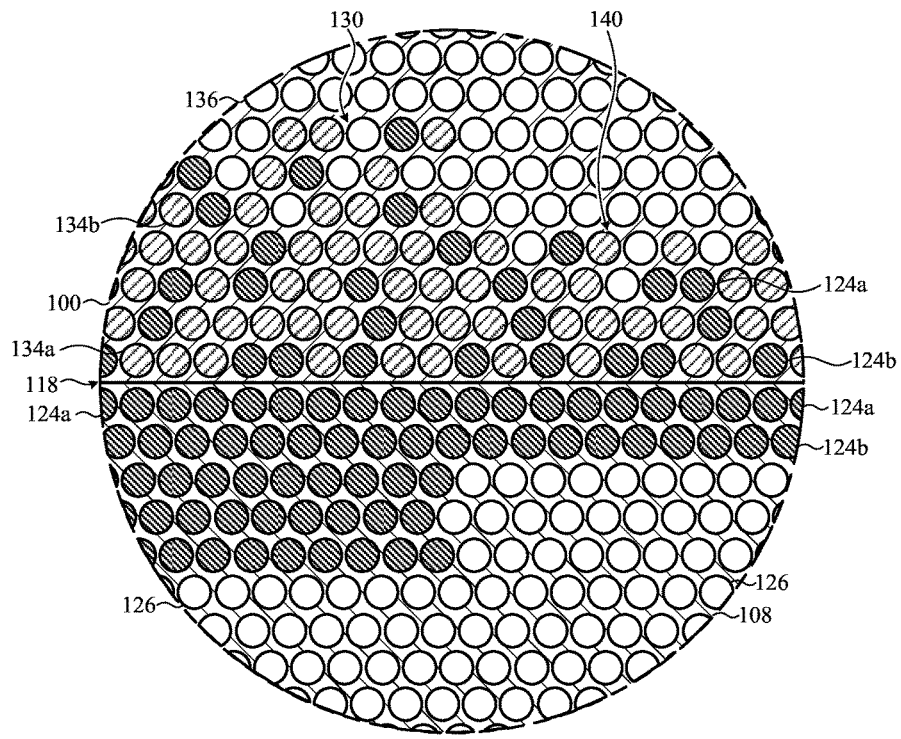
FIG. 2G depicts an enlarged portion 2G-2G of the sapphire material and the opaque substrate material of FIG. 2F.

As shown in FIG. 2F and corresponding enlarged portion shown in FIG. 2G, operational parameters or characteristics of laser 120 and/or laser beam 122 may be adjusted to form distinct visible colors within sapphire material 100. For example, the operational parameters or characteristics (e.g., frequency, pulse width, and so on) of laser 120 and/or laser beam 122 are altered, and a distinct portion of opaque substrate material 108 may be exposed to laser beam 122. As similarly discussed herein with respect to laser-induced chemically changed portion 128 as shown in FIG. 2C, exposure to laser beam 122 having the altered operational parameters or characteristics induces a distinct chemical change in portion 142 of sapphire material 100, which results in creating a distinct visible color region 140 in distinct chemically changed portion 142 of sapphire material 100. Visible color region 140 can be distinct from both the visible color in chemically changed portion 128 and the unaffected, transparent portion of sapphire material 100.

Enlarged portion shown in FIG. 2G further depicts the distinction in chemically changed portions 128, 142 and/or the visible color regions 130, 140 formed therein. As similarly discussed herein with respect to laser-induced chemically changed portion 128 as shown in FIGS. 2D and 2E, chemically changed portion 142 extends into sapphire material 100, where the chemical, atomic and/or compositional change (e.g., number of exited atoms 134$b$) varies or decreases as the distance from interface 118 increases. Additionally, and as discussed herein with respect to FIGS. 2D and 2E, the number of transferred and embedded atoms 124 from opaque substrate material 108 also decreases as the distance extending into sapphire material 100 from interface 118 increases.

As shown in FIG. 2G, distinct, chemically changed portion 142 also differs from chemically changed portion 128 as a result in the alteration in the operational parameters and/or characteristics of laser 120 and/or laser beam 122. In the non-limiting example, chemically changed portion 142 does not extend into or is not formed within sapphire material 100 as deep as chemically changed portion 128. That is, the laser-induced chemical change in portion 128 occupies or takes up more space or depth within sapphire material 100, than the distinct laser-induced chemical change in portion 142. As discussed in detail herein, the distinct chemical change formed in portion 142 results in a distinct visible color region 140 formed in sapphire material 100.

Figure 3A:
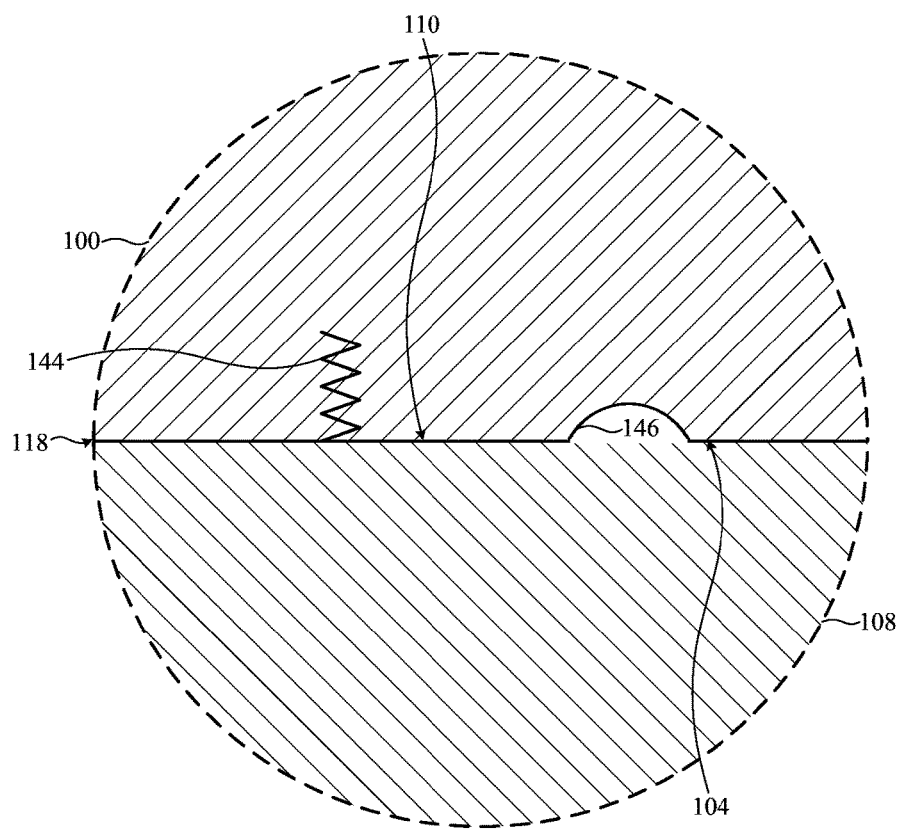
FIG. 3A depicts an enlarged front, cross-section view of a portion of sapphire material and opaque substrate material of FIG. 2A prior to being exposed to the laser.
Figure 3B:
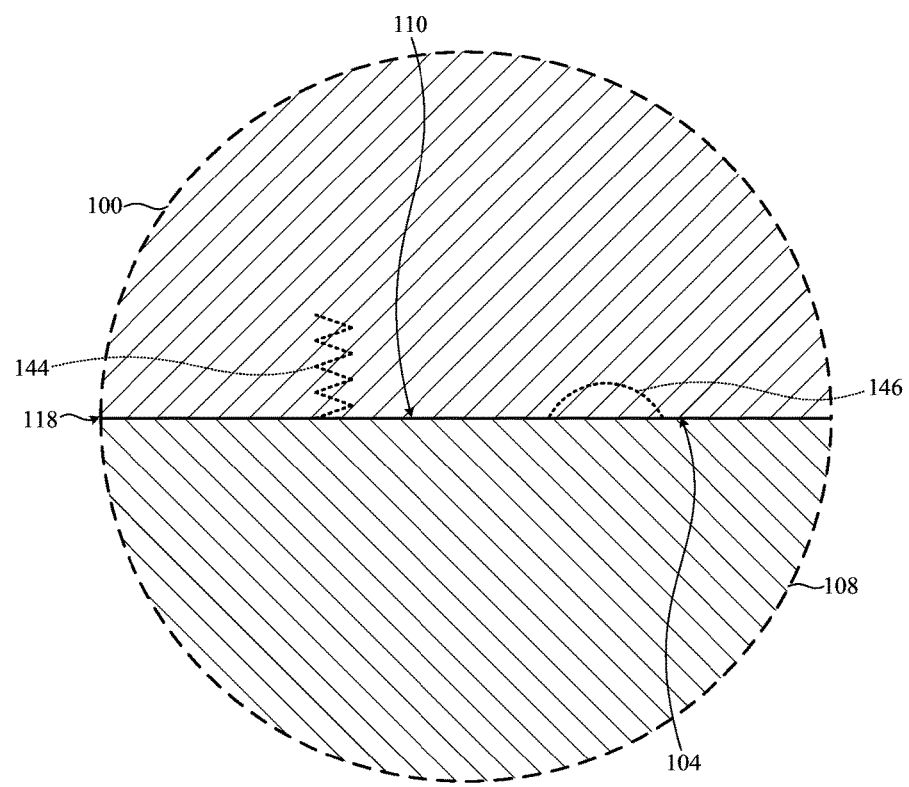
FIG. 3B depicts an enlarged front, cross-section view of a portion of sapphire material and opaque substrate material of FIG. 2A after being exposed to the laser.

Sapphire material 100 may be affected by the various processes for coloring sapphire material 100 in distinct ways. In a non-limiting example, the exposure to laser beam 122 and/or the laser-induced chemical change formed in sapphire material 100 may result in altering or changing the physical characteristics of sapphire material 100. FIGS. 3A and 3B show an enlarged portion of sapphire material 100 and opaque substrate material 108, as shown in FIGS. 2B, 2D, 2E and 2G.

FIG. 3A shows a portion of sapphire material 100 and opaque substrate material 108 prior to being exposed to laser beam 122. In the non-limiting example shown in FIG. 3A, sapphire material 100 includes material defects, such as a crack 144 and a void or gap 146 formed on bottom surface 104. Crack 144 and/or gap 146 may be formed due to normal wear-and-tear (e.g., transportation) of sapphire material 100 and/or because bottom surface 102 of sapphire material 100 includes a crystallographic plane orientation that is substantially brittle and susceptible to cracking or chipping. Additionally, crack 144 and/or gap 146 may be formed when performing initial processes (e.g., polishing, cutting, planning and so on) on sapphire material 100 prior to performing the coloring process. Material defects, such as crack 144 and gap 146, negatively affect sapphire material 100. For example, cracks 144 and gap 146 make the material susceptible to damage and/or weaken the material.

FIG. 3B shows a portion of sapphire material 100 and opaque substrate material 108 after being exposed to laser beam 122, where sapphire material 100 and opaque substrate material 108 have undergone a chemical, atomic and/or compositional change, as discussed herein with respect to FIG. 2C. In the non-limiting example shown in FIG. 3B, exposure to laser beam 122 and the inducing of the chemical, atomic and/or compositional change alters or changes the physical and/or material characteristics of sapphire material 100 by filling crack 144 and gap 146 (shown in phantom). In the non-limiting example, the exposure to laser beam 122, and the subsequent effects of laser beam 122 on opaque substrate material 108 heats or provides heat via laser beam 122 to bottom surface 104 of sapphire material 100. This heat melts, reflows and/or anneals the portion of sapphire material 100 including crack 144 and gap 146 to eliminate the material defects. Additionally, the laser-induced chemical change that occurs in both sapphire material 100 and opaque substrate material 108 cures the material defects in sapphire material 100. That is, and as discussed herein with respect to FIG. 2C, as excited atoms of opaque substrate material 108 are transferred and embedded in sapphire material 100 and/or as atoms associated with oxygen in sapphire material 100 are altered or removed, crack 144 and gap 146 are substantially filled by the transferring of atoms between the two components.

Figure 4:
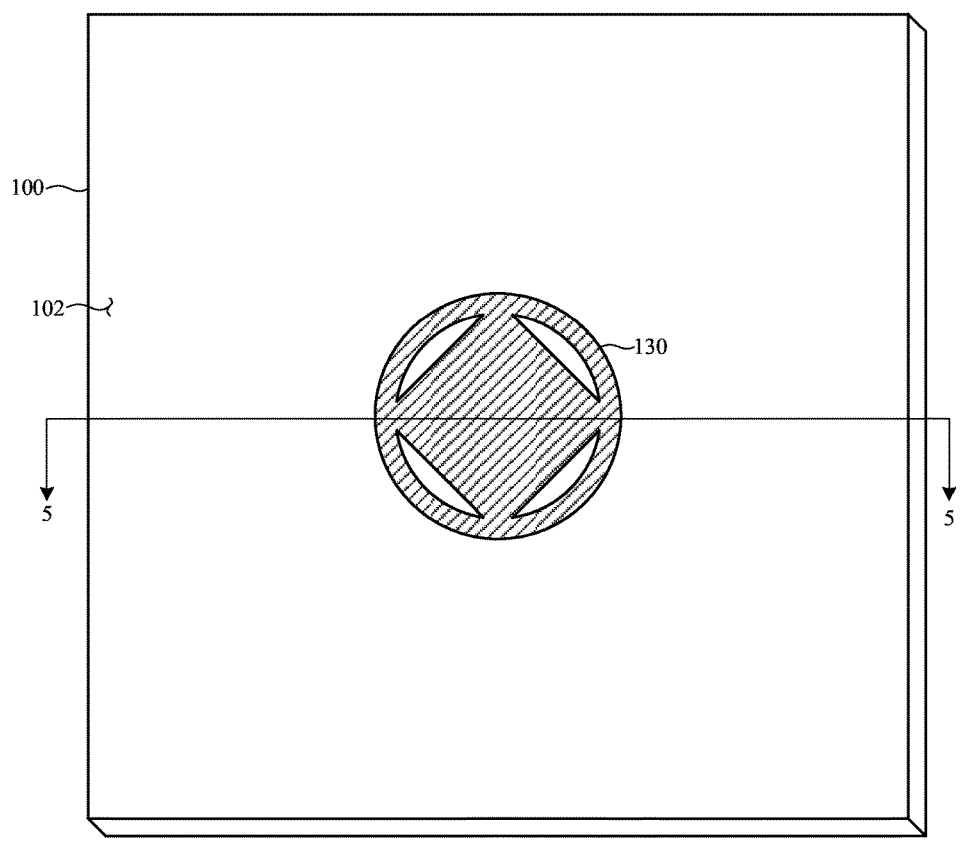
FIG. 4 depicts a top view of a portion of a sapphire material having a visible colored portion formed therein.

FIG. 4 depicts a top view of sapphire material 100 having a visible color region 130. As shown in FIG. 4, visible color region 130 is seen when looking at top surface 102 of sapphire material 100. In a non-limiting example, visible color region 130 may be seen through the transparent, unaltered portion of sapphire material 100 that is positioned above visible color region 130 and does not undergo the laser-induced chemical change, as discussed herein. Visible color region 130 created on or in sapphire material 100 may be created as a design (e.g., logo, graphic, glyph and so on). As discussed herein, sapphire material 100, having a design formed from visible color region 130, and the process detailed above, may be utilized in an electronic device in a variety of components and uses.

Figure 5A:
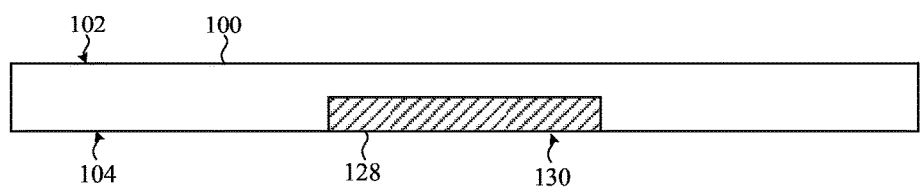
FIG. 5A depicts a first cross-section view of the sapphire material of FIG. 4, showing a first option for a colored region formed in the sapphire material.
Figure 5B:
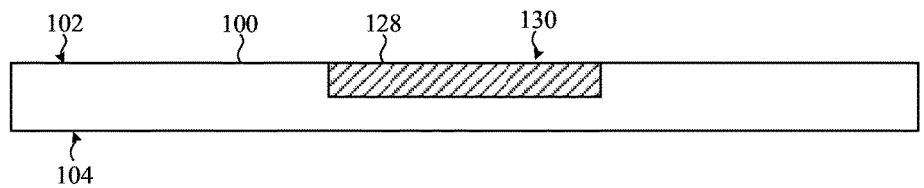
FIG. 5B depicts an alternative cross-section view of the sapphire material of FIG. 4, showing a second option for a colored region formed in the sapphire material.

FIGS. 5A and 5B depict cross-section views of sapphire material 100 of FIG. 4, taken along line 5-5 and showing two different version of a colored pattern or portion of sapphire material. FIG. 5A shows sapphire material 100 having visible color region 130 formed on bottom surface 104 of sapphire material 100. When sapphire material 100 having visible color region 130 formed on bottom surface 104 forms a component of an electronic device, as discussed herein, visible color region 130 is formed on an interior surface of the component formed from sapphire material 100. As such, visible color region 130 is not exposed and is seen through the unaltered, transparent portion of sapphire material 100, as discussed herein.

In another non-limiting example shown in FIG. 5B, visible color region 130 is formed on top surface 102 of sapphire material 100. To form visible color region 130 on top surface 102, sapphire material 100 is positioned over opaque substrate material 108 in a "flipped" orientation when performing the process of coloring sapphire material 100, as discussed herein with respect to FIGS. 2A-2G. In the non-limiting example, top surface 102 of sapphire material 100 and top surface 110 of opaque substrate material 108 contact and/or are positioned adjacent each other to form interface 118 as discussed herein. Once visible color region 130 is formed on top surface 102 of sapphire material 100, sapphire material 100 can be flipped so visible color region 130 is exposed and/or directly seen when viewing sapphire material 100, as shown in FIG. 5B.

When sapphire material 100 having visible color region 130 formed on top surface 102 forms a component of an electronic device, visible color region 130 is formed on an exterior surface of the component formed from sapphire material 100. As such, visible color region 130 may be exposed and may be directly visible to a user of the electronic device having sapphire material 100 with visible color region 130 formed on top surface 102.

Figure 6:
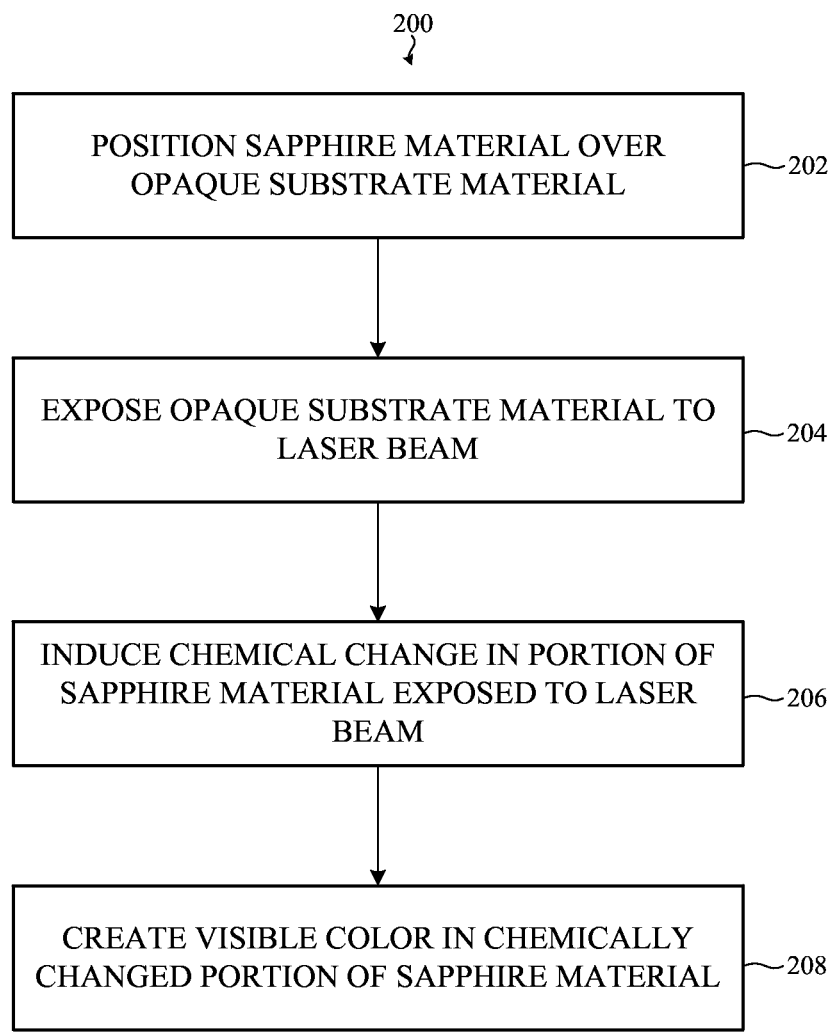
FIG. 6 depicts a flow chart of an example process for coloring a sapphire material.

FIG. 6 depicts an example process for coloring a sapphire material. Specifically, FIG. 6 is a flowchart depicting one example process 200 for coloring a portion of a sapphire material, such that the colored portion of the sapphire material is of a distinct color and/or transparency than the remaining portions of the sapphire material. In some cases, the colored sapphire material may be utilized in an electronic device, as discussed below with respect to FIGS. 7A and 7B.

In operation 202, sapphire material is positioned over an opaque substrate material. Sapphire material is disposed, placed or positioned over the opaque substrate material to form an interface between two contacting surfaces of the sapphire material and the opaque substrate material. In a non-limiting example, no gap or intermediate layer is positioned between the sapphire material and the opaque substrate material. In another non-limiting example, a gap and/or at least one intermediate layer may be positioned between and contact each of the sapphire material and the opaque substrate material.

In operation 204, the opaque substrate material is exposed to a laser beam. The laser beam passes through the sapphire material to contact the opaque substrate material. In exposing the opaque substrate material, atoms in a portion of the opaque substrate material are altered from a steady state to an excited state.

In operation 206, a chemical change is induced in a portion of the sapphire material exposed to the laser beam. Specifically, portions of the sapphire material positioned adjacent the opaque substrate material that is exposed to the laser beam undergo a laser-induced chemical change. The inducing of the chemical change in the portion of the sapphire material includes transferring a portion of the excited atoms of the opaque substrate material, and subsequently embedding the excited atoms of the opaque substrate material at least partially through the sapphire material. Additionally, the inducing of the chemical change in the portion of the sapphire material includes altering the sapphire material at a surface of the sapphire material contacting the opaque substrate material, and altering at least an internal portion of the sapphire material positioned adjacent the altered surface of the sapphire material. The inducing of the chemical change in the portion of the sapphire material also includes, altering the amount of oxygen in the portion of the sapphire material including the chemical change, altering the surface atoms of the sapphire material, and/or changing the physical characteristics and/or the chemical composition of the sapphire material exposed to the laser beam.

In operation 208, a visible color is created in the portion of the sapphire material as a result of the chemical change. That is, a visible color, which may be viewed through the remaining unaffected, transparent portions of the sapphire material, is formed or created in the laser-induced, chemically-changed portion of the sapphire material. The visible color that is created on the sapphire material is a color within the visible color spectrum. Additionally, the visible color created in the sapphire material is dependent upon the material composition of the opaque substrate material and/or the operational parameters and/or characteristics (e.g., laser frequency, laser wavelength, laser pulse length, and so on) of the laser beam.

Figure 7A:
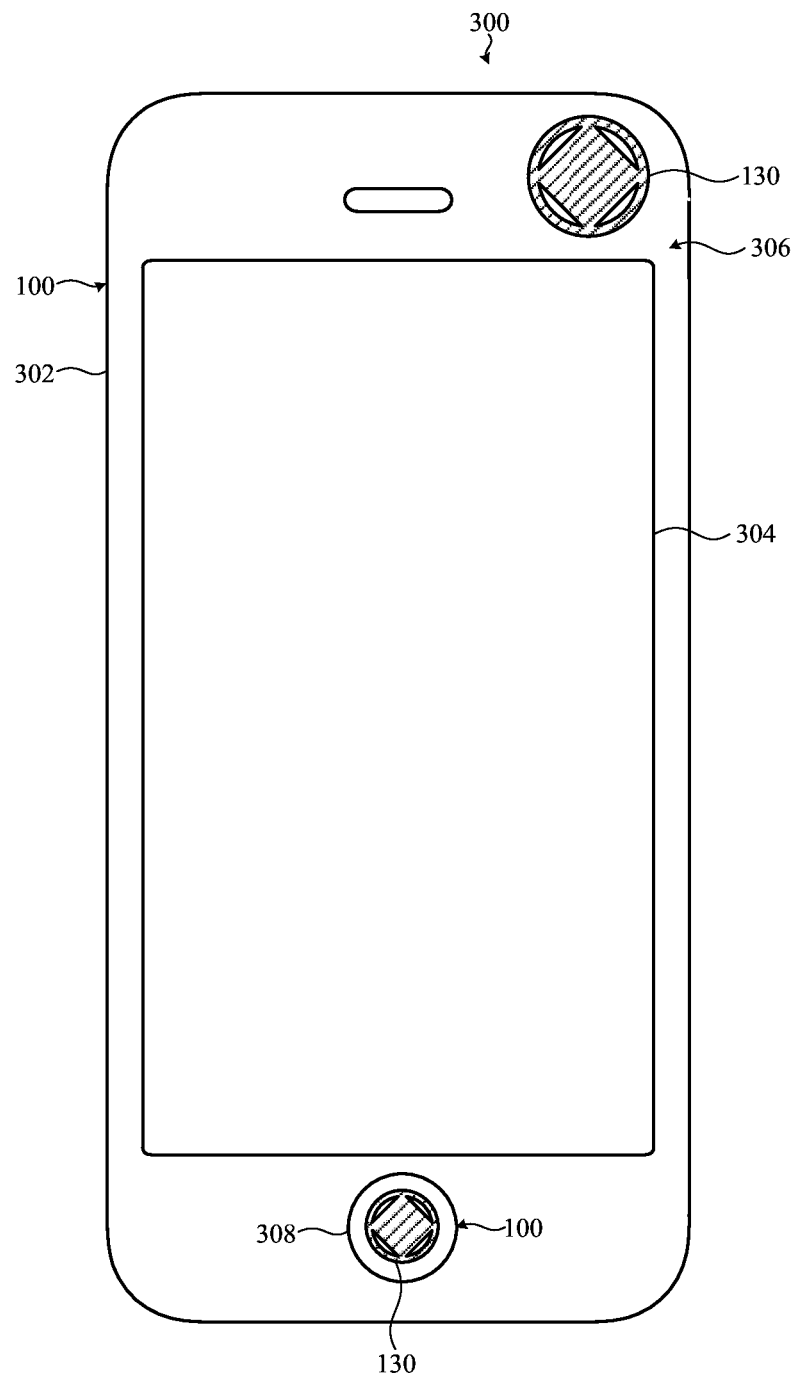
FIG. 7A depicts a front view of an electronic device including a sapphire material having a visible colored portion.
Figure 7B:
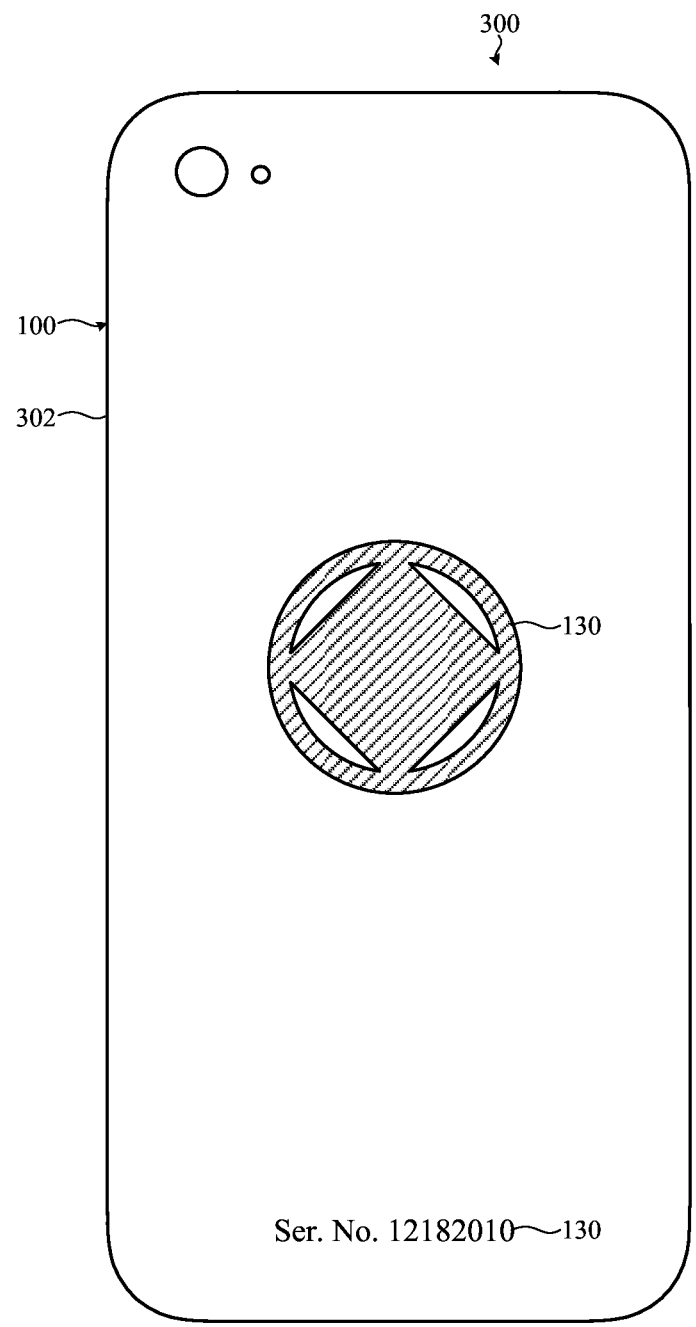
FIG. 7B depicts a back view of the electronic device of FIG. 7A including a sapphire material having a visible colored portion.

Turning to FIGS. 7A and 7B, a front and back view of one example of an electronic device 300 that may utilize sapphire material 100 including visible color region 130 is shown. In the illustrated embodiment, electronic device 300 is implemented as a smart telephone. Other embodiments can implement electronic device 300 differently, such as, for example, as a laptop or desktop computer, a tablet computing device, a gaming device, a display, a digital music player, a wearable computing device or display, a health monitoring device, and so on.

Electronic device 300 includes a housing 302 at least partially surrounding a display 304, a cover glass 306 substantially covering display 304 and one or more buttons 308 or input devices (see, FIG. 7A). Housing 302 can form an outer surface or partial outer surface and protective case for the internal components of the electronic device 300, and may at least partially surround display 304 positioned within an internal cavity formed by housing 302. Housing 302 can be formed of one or more components operably connected together, such as a front piece and a back piece (see, FIG. 7B). Alternatively, housing 302 can be formed of a single piece operably connected to display 304.

Display 304 can be implemented with any suitable technology, including, but not limited to, a multi-touch sensing touchscreen that uses liquid crystal display (LCD) technology, light emitting diode (LED) technology, organic light-emitting display (OLED) technology, organic electroluminescence (OEL) technology, or another type of display technology. Display 304 may be positioned within an internal cavity of housing 302 and may be substantially protected on almost all sides by housing 302.

Cover glass 306 may be formed integral with and/or may be coupled to housing 302 to substantially cover and protect display 304. Cover glass may cover at least a portion of the front surface of electronic device 300. When a user interacts with display 304 of electronic device 300, the user may touch or contact cover glass 306.

Button 308 can take the form of a home button, which may be a mechanical button, a soft button (e.g., a button that does not physically move but still accepts inputs), an icon or image on a display, and so on. Further, in some embodiments, button 308 can be integrated as part of cover glass 306 of the electronic device 300.

Electronic device 300 can utilize sapphire material 100 having visible color region 130 to form at least a portion of an external surface of housing 302. That is, sapphire material 100 is utilized as a variety of components in electronic device 300, and the component formed from sapphire material 100 may form at least a portion of the external surface and/or a portion of housing 302 of electronic device 300. In a non-limiting example shown in FIG. 7A, sapphire material 100 is utilized to form cover glass 306 for protecting display 304. In another non-limiting example shown in FIG. 7A, sapphire material 100 is utilized to form button 308 or at least an external layer of button 308 of electronic device 300. In both, non-limiting examples shown in FIG. 7A, sapphire material 100 utilized in electronic device 300 includes visible color region 130 formed therein as a design, in a similar fashion or process of that discussed herein with respect to FIGS. 2A-2C.

In another non-limiting example shown in FIG. 7B, a portion of housing 302 is formed from sapphire material 100 including visible color region 130 formed as a design (e.g., logo, glyphs, and the like). In the non-limiting example, sapphire material 100 including visible color region 130 forms at least a portion of an exposed surface of housing 302.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method of coloring a sapphire material comprising:
   positioning the sapphire material over an opaque substrate material;
   exposing the opaque substrate material to a laser beam passing through the sapphire material to impact the opaque substrate material;
   inducing a chemical change in a portion of the sapphire material exposed to the laser beam; and
   creating a visible color in the portion of the sapphire material as a result of the chemical change.

2. The method of claim 1, wherein exposing the opaque substrate material comprises exciting atoms of the opaque substrate material exposed to the laser beam.

3. The method of claim 2, wherein inducing the chemical change in the portion of the sapphire material comprises moving a portion of the excited atoms of the opaque substrate material to the sapphire material.

4. The method of claim 3, wherein inducing the chemical change in the portion of the sapphire material comprises embedding the excited atoms within the sapphire material.

5. The method of claim 1, wherein inducing the chemical change in the portion of the sapphire material comprises altering an amount of oxygen in the portion of the sapphire material.

6. The method of claim 1, wherein inducing the chemical change in the portion of the sapphire material comprises:
   altering a surface of the sapphire material contacting the opaque substrate material; and
   altering at least an internal region of the sapphire material adjacent the surface of the sapphire material.

7. The method of claim 1, wherein inducing the chemical change in the portion of the sapphire material comprises altering surface atoms of the sapphire material exposed to the laser beam.

8. The method of claim 1, wherein exposing the interface between the sapphire material and the opaque substrate material to the laser beam comprises changing physical characteristics of the sapphire material exposed to the laser beam.

9. The method of claim 1, wherein the opaque substrate material is metal.

10. The method of claim 1, wherein the visible color is dependent on at least one of:
    a material composition of the opaque substrate material; and
    operational parameters of the laser beam.

11. The method of claim 10 further comprising:
    altering the operational parameters of the laser beam;
    exposing a distinct portion of the substrate material to a laser beam;
    inducing a chemical change in a second portion of the sapphire material exposed to the laser beam and positioned adjacent the distinct portion of the substrate material exposed to the laser beam; and
    creating a second visible color in the second portion of the sapphire material.

12. A sapphire component comprising:
    a first transparent portion; and
    a second, colored portion substantially surrounded by the first portion, the second, colored portion comprising a chemical composition different than that of the first portion.

13. The sapphire component of claim 12, wherein the second, colored portion extends internally from a surface and partially through the sapphire component.

14. The sapphire component of claim 13, wherein the chemical composition of the second, colored portion varies between the surface and an internal portion of the sapphire component.

15. The sapphire component of claim 12, wherein the color of the second portion is visible through the first portion.

16. The sapphire component of claim 12 further comprising:
a third portion positioned adjacent to the second, colored portion and substantially surrounded by the first portion, the third portion comprising a second chemical composition, thereby imparting a second color to the third portion.

17. An electronic device comprising:
a housing;
a cover glass coupled to the housing for protecting a display positioned within the housing;
an input surface positioned through a portion of the housing; wherein
at least one of the housing, cover glass and input button is a sapphire component comprising:
a first portion; and
a second, colored portion positioned adjacent the first portion, the second portion comprising:
a first set of atoms; and
a second set of atoms embedded with the first set of atoms, the second set of atoms of a different type than the first set of atoms.

18. The electronic device of claim 17, wherein:
the second portion derives its color from the second set of atoms; and
the second set of atoms are metallic.

19. The electronic device of claim 17, wherein the second portion is formed on an interior surface of the sapphire component.

20. The electronic device of claim 17, wherein the second portion is formed on an exterior surface of the sapphire component.

* * * * *